United States Patent [19]
Kawakami et al.

[11] Patent Number: 5,835,475
[45] Date of Patent: Nov. 10, 1998

[54] OPTICAL DEVICE AND OPTICAL PICKUP DEVICE

[75] Inventors: Takashi Kawakami, Tokyo; Tokio Kanada; Takuya Kaeriyama, both of Kanagawa, all of Japan

[73] Assignee: Sony Corporation, Tokyo, Japan

[21] Appl. No.: 815,929

[22] Filed: Mar. 13, 1997

[30] Foreign Application Priority Data

Mar. 22, 1996 [JP] Japan ................................. 8-093111

[51] Int. Cl.⁶ ........................................................ G11B 7/12
[52] U.S. Cl. ........................................ 369/112; 369/44.23
[58] Field of Search ........................... 369/44.23, 44.11, 369/44.12, 112, 122

[56] References Cited

U.S. PATENT DOCUMENTS 4,973,832  11/1990  Marchant et al. ................... 369/44.23
5,050,153   9/1991  Lee .......................................... 369/112

FOREIGN PATENT DOCUMENTS 5-36767  2/1993  Japan .............................. H01L 21/66

*Primary Examiner*—Tod R. Swann
*Assistant Examiner*—Kim-Kwok Chu
*Attorney, Agent, or Firm*—Limbach & Limbach L.L.P.

[57] ABSTRACT

An optical pickup apparatus has an optical system and an objective lens. The optical system has a semiconductor laser and an optical element. The semiconductor laser has an astigmatic difference in which an oscillated light beam has a light emission point in a semiconductor junction plane different from that in a plane normal to the semiconductor junction plane. The optical element is arranged in a light path of a light beam radiated from the semiconductor laser for over-correcting the astigmatic aberration of the light beam radiated from the semiconductor laser. The objective lens converges the light beam radiated by the light source via the optical element.

12 Claims, 13 Drawing Sheets

OPTICAL DEVICE AND OPTICAL PICKUP DEVICE

BACKGROUND OF THE INVENTION

1. Field of the Invention

This invention relates to an optical device and an optical pickup device. More particularly, it relates to an optical device and an optical pickup device employing a semiconductor laser.

2. Description of the Related Art

Up to now, in a disc recording/reproducing apparatus, employing an optical disc as a recording medium, an optical pickup device is used as recording/reproducing means for information signals.

This optical pickup device uses a semiconductor laser device 1, as a light source, and has a collimator lens 2 for refracting a light beam L1, radiated as scattered light from the semiconductor laser device 1 as a point light source, into a collimated light beam. The optical pickup device uses an infinite optical system in which a light beam radiated from the semiconductor laser device 1 has no focusing point. The light beam L1, collimated by the collimator lens 2, is collimated by the collimator lens 2 and converged by an objective lens 3 so as to form a beam spot on the signal recording surface 4a of an optical disc 4.

The light beam L1, illuminated on the signal recording surface 4a of an optical disc 4, is controlled to scan a pre-set recording track. The light beam L1 is controlled by displacing the objective lens 3 a direction shown by arrow T in FIG. 2, which is the direction of a plane lying at right angles with the optical axis of the objective lens 3, based on tracking error signals obtained on detecting the return light reflected from the optical disc 4. The objective lens 3 is displaced by an objective lens driving device drive-controlling the objective lens 3 responsive to the tracking error signal.

By the objective lens 3 thus being displaced in the direction of the plane lying at right angles with its optical axis, the beam spot of the light beam L1, converged by the objective lens 3, is controlled to scan a pre-set recording track.

Since the information signals can be recorded to a high density on the optical disc, a small-sized disc 64 mm in diameter has now been offered to the market. In a disc recording/reproducing apparatus, employing such small-sized optical disc as a recording medium, the apparatus itself is required to be further reduced in size in keeping up with the small disc size. Fur reducing the size of the disc recording/reproducing apparatus, the optical pickup device, constituting the recording/reproducing means used therein, also needs to be reduced in size.

In the optical pickup device, employing the above-described infinite optical system, the collimator lens 2 is provided as an optical element for collimating the light beam radiated as the scattered light from a semiconductor laser device 1. The optical pickup device is increased in size at least by a value corresponding to the size of the collimator lens.

The optical pickup device, proposed therein, is configured so that a light beam L2 radiated from the semiconductor laser device 1 directly falls on the objective lens 3, without being collimated, so as to be thereby converged to be radiated on the signal recording surface of the optical disc 4. Insofar as the return light reflected from the optical disc 4 is concerned, the present optical pickup device 3 constitutes a light path having the point of oscillation of the semiconductor laser device 1 as a focal point. Thus the optical pickup device 3 is termed an optical pickup device constituting an infinite optical system, as contrasted to an optical pickup device constituting an infinite optical system shown in FIG. 1.

With the optical pickup device of FIG. 1, constructed as the infinite optical system, the light beam L1, converged by the objective lens 3 so as to be illuminated on the optical disc 4, has its converging point F1 coincident with the optical axis P1 of the objective lens 3, as long as the objective lens 3 is positioned within the light beam L1, even if the objective lens 3 is displaced in the tracking direction perpendicular to its optical axis.

On the other hand, in the optical pickup device, shown in FIG. 3, employing the finite optical system, the objective lens 3 is displaced towards the outer periphery of the light beam L2 in the state of the diffused light centered about the oscillation point of the semiconductor laser device 1, if the objective lens 3 is displaced in the tracking direction. The result is that the light beam L2 converged by the objective lens 3 so as to be illuminated on the optical disc 4 has its converging point F2 offset by a pre-set amount from the optical axis P1 of the objective lens 3 to assume an image height y1, to produce a so-called field-of-view deflection.

As the semiconductor laser device 1, employed as a light source of the optical pickup device, a gain guiding type semiconductor laser device, which is a sort of a double hetero junction semiconductor laser element, is used.

With the double hetero junction semiconductor laser element, used as a light source for the optical pickup device, there is no risk of an increased noise level ascribable to the self-coupling effect by the return light reflected from the signal recording surface of the optical disc. Therefore, the gain-guiding type semiconductor laser element can be effectively used as a light source for the optical pickup device used in an optical disc recording/reproducing apparatus configured for recording and/or reproducing image signals or digital data that are in need of a high S/N ratio. The reason is that, as compared to the index guiding type element of the analogous type in which the semiconductor laser element performs longitudinal oscillation of single frequency mode, the gain-guiding type semiconductor laser element performs longitudinal multiple frequency mode oscillation, and hence has such properties that the oscillation is not disturbed by the return light from the optical disc.

However, from the viewpoint of optical characteristics, the beam waist of the oscillated light of the gain-guiding type semiconductor laser element within the semiconductor junction surface (X–Y plane) differs from that in a plane perpendicular thereto (X–Z plane), as shown in FIGS. 5 and 6. Specifically, the beam waist is at a point A, coincident with a mirror surface 11a, in the vertical plane (X–Z plane), while being at a point B, intruded to an active plane 11b, inwardly of the mirror plane 11a, of the semiconductor laser device 1, within the junction plane (X–Y plane). The distance $\Delta Z$ between the points A and B in FIG. 6 is termed an astigmatic difference. Thus the point of convergence of the oscillated light in the junction plane (X–Y plane) differs from that in the plane perpendicular thereto (X–Z plane) thus producing an astigmatic aberration.

If this type of the semiconductor laser element is used as a light source for the optical pickup device, the astigmatic aberration is produced by the light beam radiated from the semiconductor laser element, and an image of the radiated light beam is formed on the signal recording surface of the optical disc, using an objective lens, the beam spot becomes distorted by the above-mentioned astigmatic aberration, thus producing a flat longitudinally or transversely elongated spot. The result is that the beam spot lies astride two neighboring recording tracks of the optical disc such that pre-set optical transfer function (OTF) characteristics cannot be obtained.

If such semiconductor laser element is used asa light source for the optical pickup device, such solution means are used in which the astigmatic aberration is not produced by the light beam radiated from the semiconductor laser element to deteriorate the OTF characteristics.

Among these solution means, there is such solution means in which only a narrow angular portion in the vicinity of the center of the light beam radiated in the dispersed state from the semiconductor laser element is taken out for use for recording and/or reproduction for decreasing the wavefront aberration which is the disturbed wavefront surface ascribable to the astigmatic aberration proper to the optical beam. With this means for solution, a collimator lens collimating the light beam radiated from the semiconductor laser element as the dispersed light, having a smaller value of the numerical aperture on the order of, for example, 0.13 NA, is used for reducing the disturbances in the wavefront ascribable to astigmatic aberration. If the collimator lens with the numerical aperture on the order of 0.13 NA is used, the wavefront aberration when a semiconductor laser element with the astigmatic aberration of 25 $\mu$m is used as a light source is 0.056 $\lambda$ in RMS value, which is within the RMS value range of the wavefront aberration which is thought to be a diffraction limit required in the optical disc recording/ reproducing apparatus. The RMS value, required as the diffraction limit in the optical disc recording/reproducing apparatus, is 0.07 $\lambda$ (mechanical criterion).

It is possible with this means for solution to suppress the wavefront aberration ascribable to the astigmatic aberration proper to the light beam radiated from the semiconductor laser element. However, because of the poor light beam utilization efficiency, the S/N ratio is undesirably deteriorated if the means for solution is used in a disc recording/ reproducing apparatus performing high-density recording of the information signals.

As another means for solution, an optical element having different coupling power depending on the direction, such as a cylindrical lens, is used for correcting the astigmatic aberration proper to the light beam radiated from the semiconductor laser element. However, since the power of the optical element is made to differ depending on the direction, the surface of the optical element, that is the lens surface, is not spherical, but is a modified curved surface that cannot be formed easily. In connection with the fact that the lens is powerful and the power is varied depending on the direction, not only the angular position of the lens relative to the optical axis of the optical element but also the position along the optical axis of the lens and the direction related to the direction-dependent power need to be adjusted, thus presenting difficulties n position adjustment of the optical element.

As means for overcoming the above-described problems, there is a semiconductor laser device described in Japanese Patent Publication No. 05-36767 (JP-B-05-36767). The semiconductor laser device, described in this publication, has a plan-parallel glass element in a light-transmitting window formed in a cap overlying the semiconductor laser element at a pre-set angle for correcting the astigmatic aberration proper to the light beam radiated from the semiconductor laser element.

If the semiconductor laser device described in the above publication is used in the optical pickup device employing the above-mentioned infinite optical system, the convergence point F1 of the light beam L1 converged by the objective lens 3 so as to be illuminated on the optical disc 4 is coincident with the optical axis P1 of the objective lens 3, as shown in FIG. 2. Therefore, the astigmatic aberration at the converging point F1 of the light beam L1 converged by the objective lens 3 may be maintained corrected by the semiconductor laser element. In this manner, the wavefront aberration ascribable to the astigmatic aberration can be suppressed to a value within the RMS value required as the diffraction limit by the optical disc recording/reproducing apparatus.

However, with the optical pickup device configured as an infinite optical system for minimizing the size of the apparatus, as shown in FIG. 3, the objective lens 3 is subjected to field-of-view deflection in which the lens is shifted to an outer peripheral side from the optical axis of the light beam L2 in the dispersed state as shown in FIG. 4 thus deteriorating the optical characteristics at the converging point F2.

Such an optical pickup device of the infinite optical system is used, in which a device having enclosed therein a gain-guiding type semiconductor laser element 1 radiating a light bam with a wavelength of 780 nm is used as a light source, and a lens having a thickness t along the optical axis P1 of 1.6 mm, a numerical aperture NA of 0.45 and a multiplication factor of 5, is used as an objective lens 3. The light beam radiated from the semiconductor laser element 1 at this time is not corrected as to the astigmatic aberration. Thus the light beam L1 radiated from the semiconductor laser element 1 is subjected to the astigmatic aberration on the order of 25 $\mu$m.

The respective types of the aberration produced at the converging point F2 of the light beam L2, that is on the signal recording surface of the optical disc 4 when the objective lens 3 of the optical pickup device is displaced in a direction at right angle with the optical axis P1, that is in the tracking direction shown by arrow T in FIG. 4, are as shown in FIG. 7. That is, the coma aberration at the converging point F2 of the light beam L2 is as shown by a curve A1 in FIG. 7, while the spherical aberration is as shown by a curve S1 in FIG. 7. the astigmatic aberration is as shown by a curve A1, while the wavefront aberration of the light beam in its entirety is as shown by R1 in FIG. 7.

It is seen from the results shown in FIG. 7 that, if the objective lens 3 is deflected a distance not less than 0.4 mm in a direction lying at right angles with its optical axis from its initial position, the wavefront aberration exceeds 0.006 $\lambda$ in terms of the RMS value, whereas, if the objective lens is deflected to a position of 0.5 mm, the wavefront aberration exceeds 0.007 $\lambda$ in terms of the RMS value, thus surpassing the RMS value of 0.07 $\lambda$ of the wavefront aberration thought to be the diffraction limit required in the optical disc recording and/or reproducing apparatus. Thus, at an outer edge of the field of view of the objective lens 3, the RMS value 0.07 $\lambda$ of the wavefront aberration, thought to be the diffraction limit, is surpassed, thus deteriorating the OTF characteristics and disabling correct recording and/or reproduction of the information signals to the optical disc 4.

It may be seen from the results shown in FIG. 7 that deterioration in the wavefront aberration by the field-of-view deflection of the objective lens 3 is mainly ascribable to the astigmatic aberration.

In the optical pickup device of the finite optical system, the optical characteristics at the converging point F2 due to the field-of-view deflection of the objective lens 3 are also varied with the thickness t of the objective lens 3.

The optical characteristics at the converging point F2 due to the field-of-view deflection of the objective lens 3 when the thickness t of the objective lens 3 is changed are now illustrated.

The light beam of 780 nm, radiated from the gain-guiding type semiconductor laser device 1, employed here, has been corrected for astigmatic aberration by astigmatic aberration correction means as described in Japanese Patent Publication No.05-36767 (JP-B-05-36367). That is, the optical characteristics generated by the field-of-view deflection of the objective lens 3 are illustrated.

The coma aberration, spherical aberration, astigmatic aberration and wavefront aberration at the converging point F2 of the objective lens 3 having a thickness t of 1.6 mm are of characteristics shown in FIGS. 8, 9, 10 and 11. The coma aberration, spherical aberration, astigmatic aberration and wavefront aberration at the converging point F2 of the objective lens 3 having a thickness t of 2.2 mm are of characteristics shown in FIGS. 8, 9, 10 and 11. Also the coma aberration, spherical aberration, astigmatic aberration and wavefront aberration at the converging point F2 of the objective lens 3 having a thickness t of 2.8 mm are of characteristics shown in FIGS. 8, 9, 10 and 11.

It is seen from the above results that the wavefront aberration due to the field-of-view deflection of the objective lens 3, influencing the OTF characteristics, are mainly affected by the astigmatic aberration and also by the thickness t of the objective lens 3 to a large extent. Thus, by increasing the thickness t of the objective lens 3, it becomes possible to improve the wavefront aberration and the astigmatic aberration significantly influencing the wavefront aberration.

However, if the thickness of the objective lens is increased, the optical pickup device is increased in size, so that the demand for size reduction cannot be met. If the objective lens is increased in size, the lens holder holding the objective lens is increased in size, while the objective lens driving device for displacing the objective lens in both the tracking direction and in the focusing direction perpendicular thereto is increased in size, thus leading to the increased size of the optical pickup device.

SUMMARY OF THE INVENTION

It is therefore an object of the present invention to provide an optical device which resolves the above-mentioned problem.

It is another object of the present invention to provide an optical pickup device which resolves the above-mentioned problem.

According to the present invention, there is provided an optical device including a semiconductor laser element and a correction unit. The semiconductor laser element has astigmatic difference in which the oscillated light has a light emission point in a semiconductor junction plane different from a light emission point in a plane perpendicular thereto. The correction unit is arranged in a light path of the light beam radiated from the semiconductor laser element for over-correcting the astigmatic aberration of the light beam radiated from the laser element.

According to the present invention, there is provided an optical pickup device including a light source, an objective lens and a correction unit. The light source radiates a light beam. The objective lens converges the light beam in the dispersed state radiated from the light source. The correction unit is arranged in the outgoing light path of the light beam radiated from the light source for over-correcting the astigmatic aberration radiated from the light source.

With the above-described optical device and the optical pickup device according to the present invention, in which the astigmatic aberration in the light beam radiated from the semiconductor laser light source is over-corrected, it becomes possible to suppress the astigmatic aberration produced when the objective lens for converging the light beam in the dispersed state is deflected away from the optical axis of the light beam radiated from the light source, thus suppressing the wavefront aberration which otherwise significantly affects the recording/reproducing characteristics.

Thus the present invention provides an optical device and an optical pickup device capable of satisfying the RMS value required as a diffraction limit required in an optical disc recording and/or reproducing apparatus, while enabling further size reduction of the apparatus.

DESCRIPTION OF THE PREFERRED EMBODIMENTS

Figure 1:
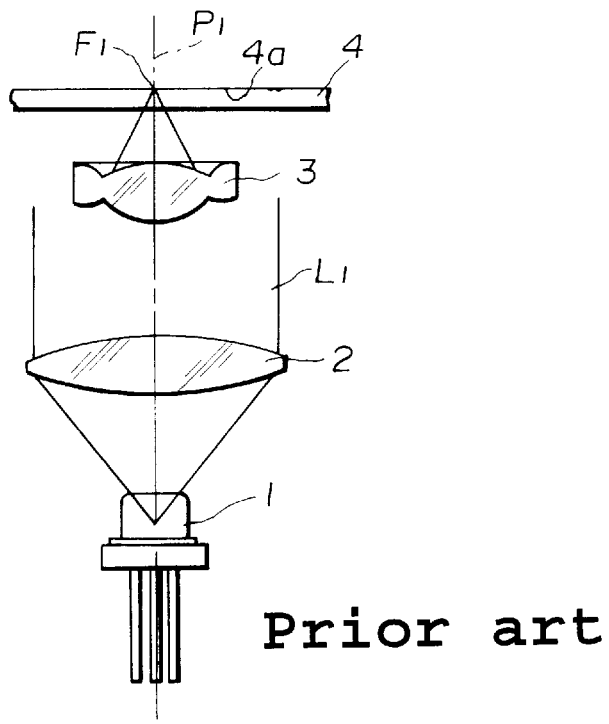
FIG. 1 is a side view showing an optical pickup device constructed in accordance with the infinite optical system.
Figure 2:
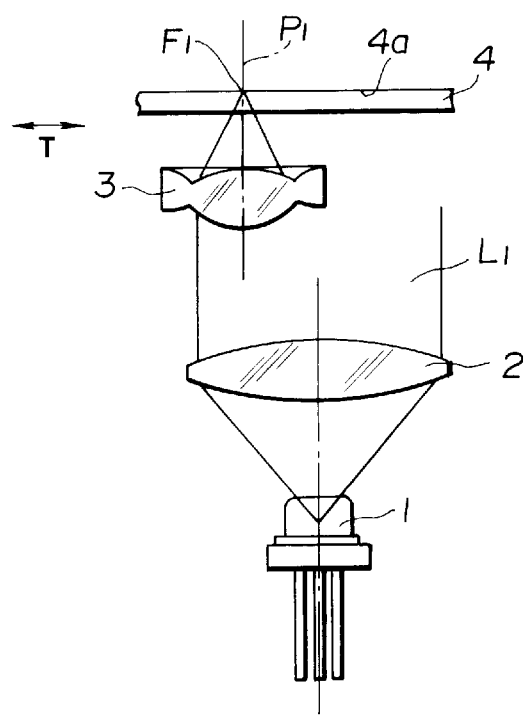
FIG. 2 is a cross-sectional side view of the optical pickup device of FIG. 1 showing the state in which the objective lens has been defected in the tracing direction.
Figure 3:
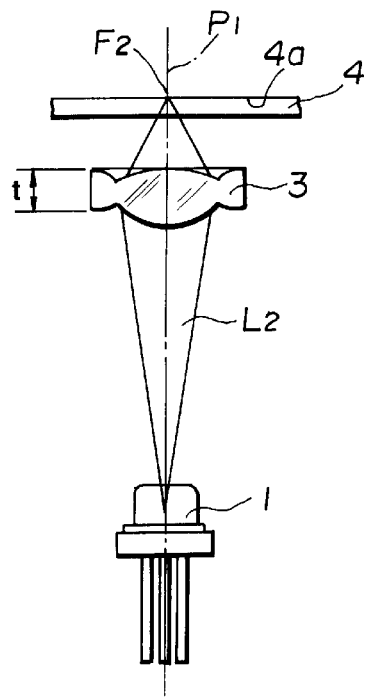
FIG. 3 is a side view showing an optical pickup device constructed in accordance with the finite optical system.
Figure 4:
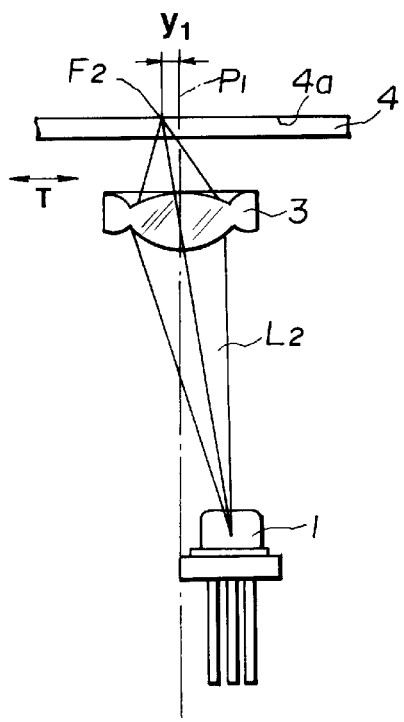
FIG. 4 is a cross-sectional side view of the optical pickup device of FIG. 3 showing the state in which the objective lens has been defected in the tracing direction.

Referring to the drawings, an optical device according to the present invention and an optical pickup device employing the optical pickup device are explained in detail.

Figure 12:
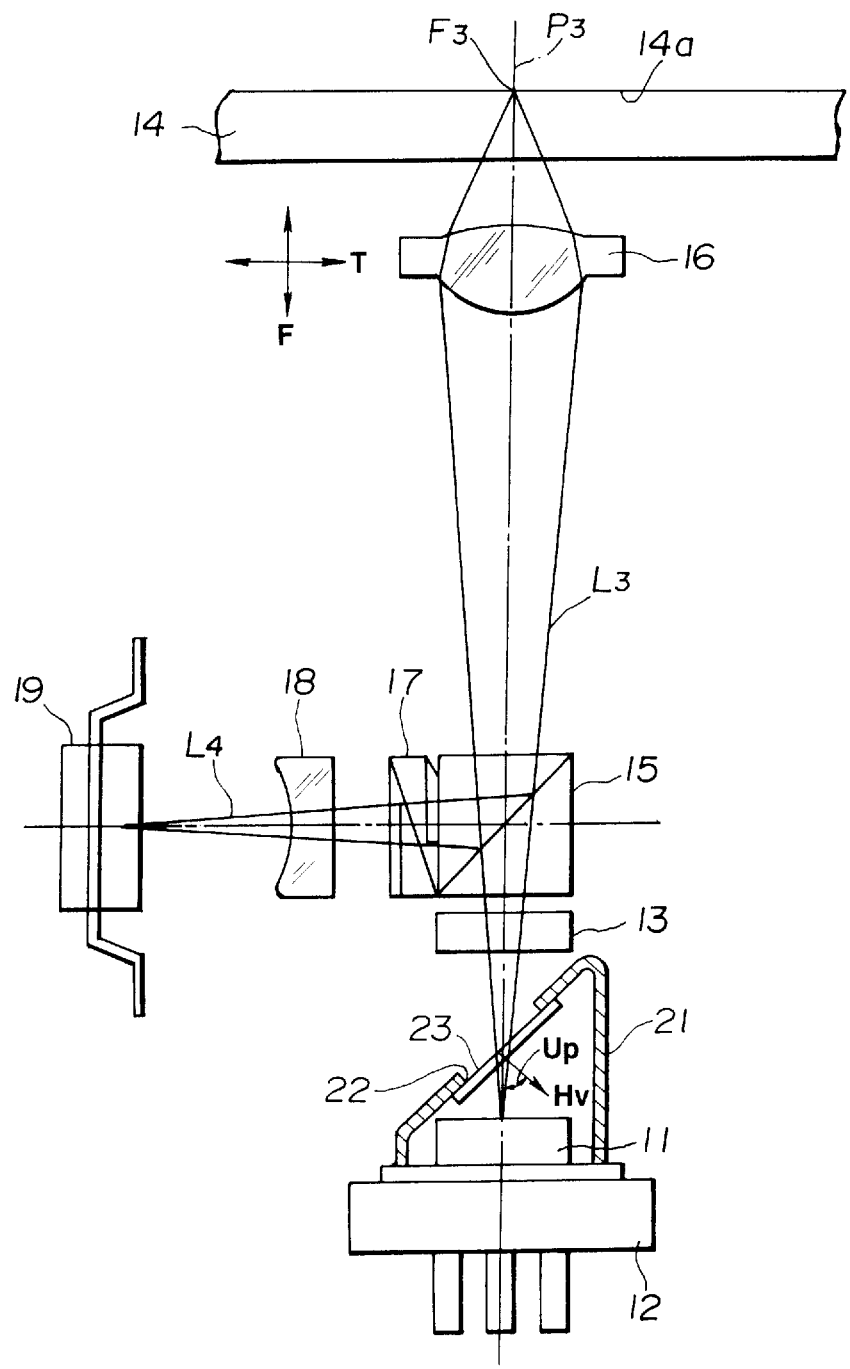
FIG. 12 is a cross-sectional side view showing an optical pickup device according to the present invention.

Referring to FIG. 12, the optical pickup device includes a semiconductor laser device 12 having enclosed therein a semiconductor laser element 11 radiating a light beam L3, and a grating 13 for dividing the light beam L3 radiated from the semiconductor laser device 12 into a main beam and two side beams. The optical pickup device also includes a beam splitter 15 for transmitting the light beam L3 radiated from the semiconductor laser element 11 and for reflecting a return beam L4 reflected from the optical disc 14, and an objective lens 16 for converging the light beam L3 transmitted through the beam splitter 15 for radiating the converged light beam L3 as a beam spot on a signal recording surface 14a of the optical disc 14.

The present optical pickup device is constructed in accordance with the infinite optical system in which the light beam L3 radiated as the diffused light from the semiconductor laser element 11 is caused to fall on the objective lens 16, without being collimated, so as to be converged by the objective lens 16 for being radiated on the optical disc 14.

Referring to FIG. 12, the optical pickup device according to the present invention includes a Wollaston prism 17 for separating the return light L4 reflected by the optical disc 14, transmitted through the objective lens 16 and reflected by the beam splitter 15 into at least two linear polarized light beams having different directions of polarization, and a multiple lens 18 for converging the return light L4 transmitted through the Wollaston prism 17. The optical pickup device also includes a light detector, such as a photodetector 19, for detecting the return light L4 converged by the multiple lens 18 for outputting information signals recorded on the optical disc 14, focusing error signals and tracking error signals for controlling the objective lens 16.

Specifically, the optical pickup device according to the present invention reads out information signals recorded on the optical disc 14 by converging the light beam L3 radiated by the semiconductor laser element 11 by the objective lens 16 for radiation on the signal recording surface 14a of the optical disc 14 and by detecting the return light L4 reflected by the signal recording surface 14a of the optical disc 14 by the photodetector 19. The optical pickup device includes an objective lens driving device, not shown, for correctly focusing the light beam L3 converged by the objective lens 16 on the signal recording surface of the optical disc 14 for correctly scanning the pre-set recording track of the optical disc 14. This objective lens driving device performs control so that, by displacing the objective lens 16 in the focusing direction parallel to the optical axis of the objective lens as shown by arrow F in FIG. 12 and in a tracking direction perpendicular to the optical axis as indicated by arrow T in FIG. 12, based on the focusing error signals and the tracking error signals detected by the photodetector, the light beam L3 radiated on the optical disc 14 via objective lens 16 will be correctly focused on the signal recording surface of the optical disc 14 while correctly scanning the pre-set recording track.

Figure 13:
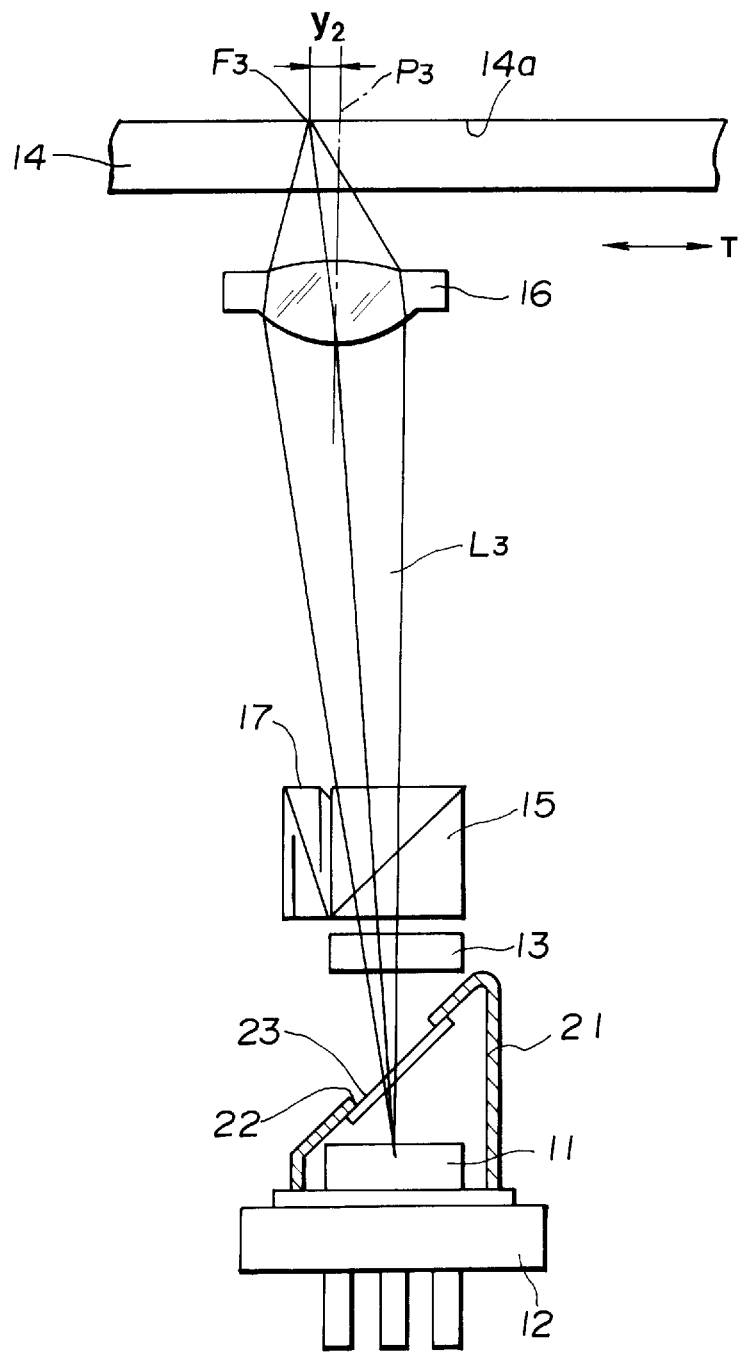
FIG. 13 is a cross-sectional side view of the optical pickup device of FIG. 12 in which the objective lens has been displaced in the tracking direction.

Since the optical pickup device is constructed in accordance with the finite optical system, when the objective lens 16 is displaced responsive to the tracking error signals in the tracking direction perpendicular to its optical axis indicated by arrow T in FIG. 12, the objective lens 16 is displaced towards an outer periphery from the optical axis P3 of the light beam L3 which is in a state of diffused light about the point of oscillation of the semiconductor laser element 11 as center, as indicated in FIG. 13. The point of convergence F3 of the light beam L3, converged by this objective lens 16 so as to be converged on the optical disc 14, is offset a pre-set distance from the optical axis P3 of the objective lens 16 to produce an image height y2, that is field-of-view deflection. That is, by the field-of-view deflection, the present optical pickup device undergoes deterioration in the optical properties on the outer peripheral side of the objective lens 16, in particular the astigmatic aberration and wavefront aberration ascribable to the astigmatic aberration.

Figure 5:
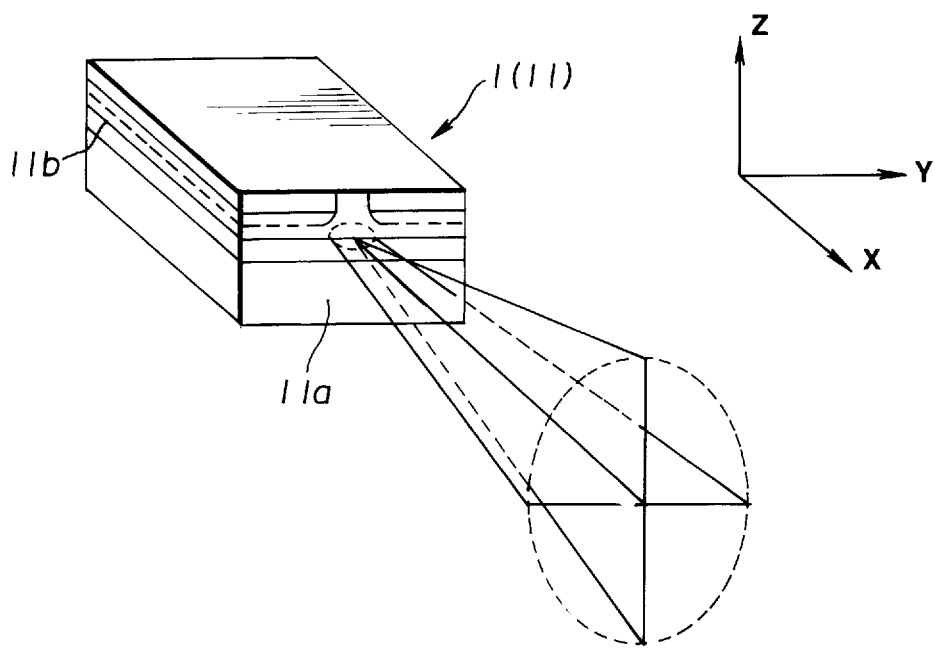
FIG. 5 illustrates the astigmatic aberration of the gain-guiding type semiconductor laser.
Figure 6:
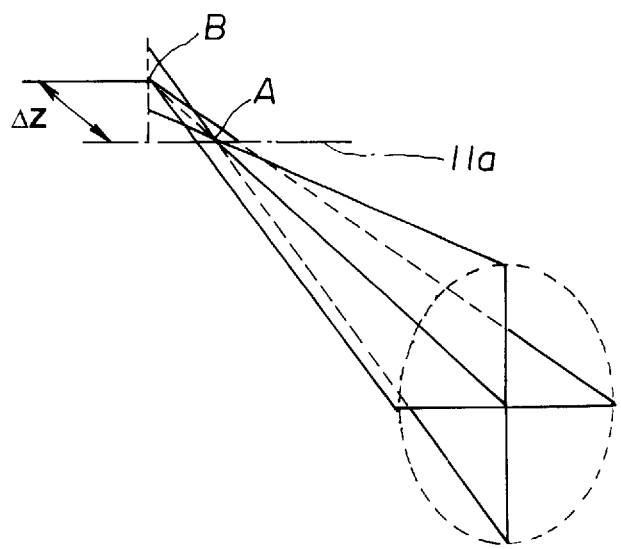
FIG. 6 illustrates, similarly to FIG. 5, the astigmatic aberration of the gain-guiding type semiconductor laser.

As the semiconductor laser element 11, used as the light source for the present optical pickup device, the above-mentioned gain-guiding type semiconductor laser element, which is a sort of a double hetero junction semiconductor laser element, is used. However, from the viewpoint of optical characteristics, the beam waist of the oscillated light of the gain-guiding type semiconductor laser element within the semiconductor junction surface (X–Y plane) differs from that in a plane perpendicular thereto (X–Z plane), as shown in FIGS. 5 and 6. Specifically, the beam waist is at a point A, coincident with a mirror surface 11a, in the vertical plane (X–Z plane), while being at a point B, intruded inwardly of the mirror plane 11a to an active plane 11b of the semiconductor laser device 1 within the junction plane (X–Y plane).. Thus the point of convergence of the oscillated light in the junction plane (X–Y plane) differs from that in the plane perpendicular thereto (X–Z plane) thus producing an astigmatic difference $\Delta Z$. Therefore, if this sort of the semiconductor laser element 11 is used as a light source, the beam spot of the light beam L3 converged on the signal recording surface 14a of the optical disc 14 is distorted to a flat longitudinally or transversely elongated shape.

Thus, in the semiconductor laser device 12 employed in the optical pickup device according to the present invention, a light-transmitting plan-parallel flat plate 23 of a pre-set thickness d1, having facing light-transmitting surfaces parallel to each other, is provided in an opening 22 formed in a cap 21 adapted to sheathe the semiconductor laser element 11. The opening 22 is adapted to be passed through by the light beam L3 radiated from the semiconductor laser element 11 and which is in the dispersed state. The plan-parallel flat plate 23 is formed of a material through which the light beam L3 radiated from the semiconductor laser element 11 can be transmitted without attenuation, and is constituted by a glass or sapphire plate, or by a transparent synthetic resin plate having light-transmitting properties.

Figure 14:
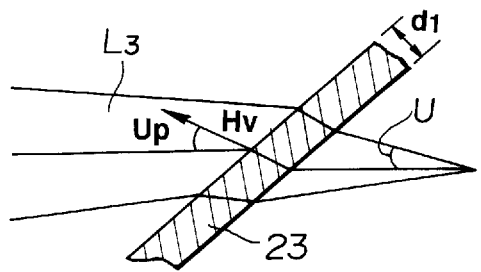
FIG. 14 illustrates correction of the astigmatic aberration by a plan-parallel plate.

The plan-parallel flat plate 23 is provided so that the normal line vector Hv thereof will be inclined at a pre-set angle $U_p$ in the semiconductor junction surface (X–Y plane) of the semiconductor laser element 11 with respect to the optical axis of the light beam L3, as shown in FIGS. 12 and 14. By providing the plan-parallel flat plate 23 in this manner, the astigmatic aberration proper to the light beam L3 radiated from the semiconductor laser element 11 is over-corrected, that is corrected so that the astigmatic aberration ascribable to the astigmatic difference $\Delta Z$, produced by the fact that the point of convergence of the oscillated light in the junction plane (X–Y plane) of the semiconductor laser element 11 differs from that in the plane perpendicular thereto, that is in the X–Z plane, will be produced in the reverse direction.

The state in which the astigmatic aberration proper to the light beam L3 radiated from the semiconductor laser element 11 is over-corrected the plan-parallel flat plate 23 is explained by referring to FIG. 14.

In the following description, it is assumed that the light beam L3 is in the converged state, only for ease in explanation. The same holds for the case in which the light beam L3 is in the dispersed state. It is assumed that the plan-parallel flat plate is disposed in the light path of the converged light beam L3 (numerical aperture NA= sin U) so that the above-mentioned normal line is set at a pre-set angle $U_p$ in the semiconductor junction plane (X–Y plane) of the semiconductor laser device 11 with respect to the optical axis of the light beam L3. According to, for example, W. J. Smith, Modern Optical Engineering (McGraw-Hill N.Y. 1996), the astigmatic aberration produced at this time is given by the following equation (1):

$$A_s = l_s - l_s = \frac{d_l}{\sqrt{N^2 - \sin^2 U}} \left[ \frac{N^2 \cos^2 U_p}{N^2 - \sin^2 U_p} - 1 \right] \quad (1)$$

In the above equation (1), 1t is the distance up to the convergent point in a plane containing the normal line and the optical axis (meridian plane) and 1s is a distance up to the converging point in a plane normal to the meridian plane (sagittal plane).

On the other hand, the coma aberration $coma_s$ is given by the following equation (2):

$$coma_s = \frac{d_1 U^2 U_p (N^2 - 1)}{2N^3} \quad (2)$$

By selecting the plate thickness d1 and the angle of inclination $U_p$ for a required numerical aperture, such as NA= sin U=0.2, based on the above equations (1) and (2), the astigmatic aberration of the opposite sign with respect to the astigmatic aberration produced by the semiconductor laser element 11 may be produced. At this time, the coma aberration, produced simultaneously, can be suppressed to a sufficiently low level. That is, for the optional angle of inclination $U_p \neq 0$, the astigmatic aberration is given by:

$$As = 1s - 1t < 0.$$

Therefore, if the meridian plane is taken as the semiconductor junction plane of the semiconductor laser element 11, the astigmatic aberration of the semiconductor laser element 11 can be over-corrected to produce the astigmatic aberration of the opposite sign.

Meanwhile, both the astigmatic aberration and the coma aberration are proportionate to the plate thickness d1 of the plan-parallel flat plate 23, while the astigmatic aberration is proportionate substantially to squares of the inclined angle $U_p$ and the coma aberration is proportionate to the inclined angle $U_p$. Thus it is preferred to use a smaller thickness d1 of the plate 23 and a larger inclination angle $U_p$ for achieving a pre-set over-correction of the astigmatic aberration, since then the coma aberration, produced simultaneously, can be suppressed to a lower value.

It is seen from above that the astigmatic aberration of the semiconductor laser device 11 can be over-corrected by the plan-parallel flat plate 23 of a pre-set plate thickness d1 provided at a pre-set angle of inclination $U_p$ of the normal line vector in the semiconductor junction plane of the semiconductor laser device 11 (X–Y plane) with respect to the optical axis.

The amount of over-correction of the astigmatic aberration of the semiconductor laser device 11 is such that, if, when the objective lens 16 is deflected in a tracking direction normal to its optical axis responsive to the tracking error signal, and the point of convergence F3 of the light bam L3 radiated on the optical disc 14 is deviated towards the outer peripheral edge of the field of view of the objective lens 16, the amount of the astigmatic aberration produced due to the astigmatic aberration proper to the semiconductor laser device 11 and the amount of the astigmatic aberration produced due to the objective lens 16 are A µm, the astigmatic aberration of –½ Aµm, that is over-correction, is applied to the light beam L3 radiated from the semiconductor laser device 11. By applying this over-correction, the astigmatic aberration of A µm on the outer peripheral edge of the field of view of the objective lens 16 becomes equal to ½ Aµm. At this time, if the point of convergence F3 of the light beam L3 is situated on the optical axis P3 of the objective lens 16, the light beam L3 radiated from the semiconductor laser device 11 is subjected to the astigmatic aberration substantially corresponding to the over-corrected astigmatic aberration. However, the astigmatic aberration over the entire field of view of the objective lens 16 can be suppressed to a value not larger than a pre-set value.

Since the astigmatic aberration can be suppressed to a value not larger than the pre-set value, the wavefront aberration, significantly influenced by the astigmatic aberration, can also be suppressed to a value not larger than the pre-set value. In this manner, the RMS value of the wavefront aberration, thought to be the diffraction limit required by the optical disc recording and/or reproducing apparatus, can be suppressed to a value not higher than the prescribed value, thereby preventing deterioration of the OTF characteristics and enabling correct recording and/or reproduction of the information signals to the optical disc 14.

The correction means for applying the over-correction to the astigmatic aberration of the light beam L3 radiated from the semiconductor laser element 11 corrects the astigmatic aberration produced by the fact that the point of convergence of the oscillated light in the junction plane (X–Y plane) of the semiconductor laser element 11 differs from that in the plane perpendicular thereto, that is in the X–Z plane. Therefore, a cylindrical lens, which is an optical element having different coupling power values depending on the direction, may be used in substitution for the plan-parallel flat plate. In such case, the cylindrical lens needs to be positioned in orientations depending on the point of convergence in the junction plane (X–Y plane) different from that in the plane normal thereto (X–Z plane).

In the above embodiment, the sole plan-parallel flat plate 23 is used for applying the over-correction to the astigmatic aberration of the light beam L3 radiated by the semiconductor laser element 11. However, since plan-parallel flat plate 23 having a thickness d1 sufficient to apply a pre-set amount of over-correction of the astigmatic aberration suffices, the plan-parallel flat plate may also be constituted by two to three such plates.

The correction means for applying the over-correction to the astigmatic aberration of the light beam L3 radiated by the semiconductor laser element 11 may also be constituted by a holographic optical element provided that it can apply the over-correction of the astigmatic aberration as described above.

In the above description, the plan-parallel flat plate 23 is provided in the window 33 of the cap 21 of the semiconductor laser device 12 for applying the over-correction to the astigmatic aberration of the light beam L3 radiated by the semiconductor laser element 11. That is, the over-correction is applied to the astigmatic aberration of the light beam L3 by the semiconductor laser device 12 itself. However, the plan-parallel flat plate 23 may also be provided between the semiconductor laser device 12 and the grating 13 outside of the semiconductor laser device 12. In this case, a light transmitting plate 25 of glass or the like, capable of simply transmitting the light beam L3 radiated from the semiconductor laser element 11, is arranged in the opening 22 of the cap 21 of the semiconductor laser device 12 for hermetically sealing the inside of the cap 21. This light transmitting plate 25 is arranged at right angles with the optical axis of the light beam L3. In this case, the plan-parallel flat plate 23 is constituted by a material through which the light beam can be transmitted by the semiconductor laser element 11 without attenuation, and specifically is formed by a glass or sapphire plate, or by a transparent synthetic resin plate having light-transmitting properties. The plan-parallel flat plate 23 may also be constituted by plural plates. Also, in the optical pickup device, shown in FIG. 15, a cylindrical lens, as an optical element having different coupling power depending on directions, may also be used in substitution for the plan-parallel flat plate 23.

In the above-described embodiments, shown in FIGS. 12 to 15, over-correction is applied to the light beam L3 radiated from the semiconductor laser element 11 by the plan-parallel flat plate 23 arranged at one point. Alternatively, the over-correction may be applied for correcting the astigmatic aberration produced by the objective lens 16 which is deviated towards the outer peripheral edge of the field of view of the objective lens 16 after correction not going so far as to over-correct the astigmatic aberration generated in the semiconductor laser element 11, that is after correcting the astigmatic aberration substantially to zero.

Figure 15:
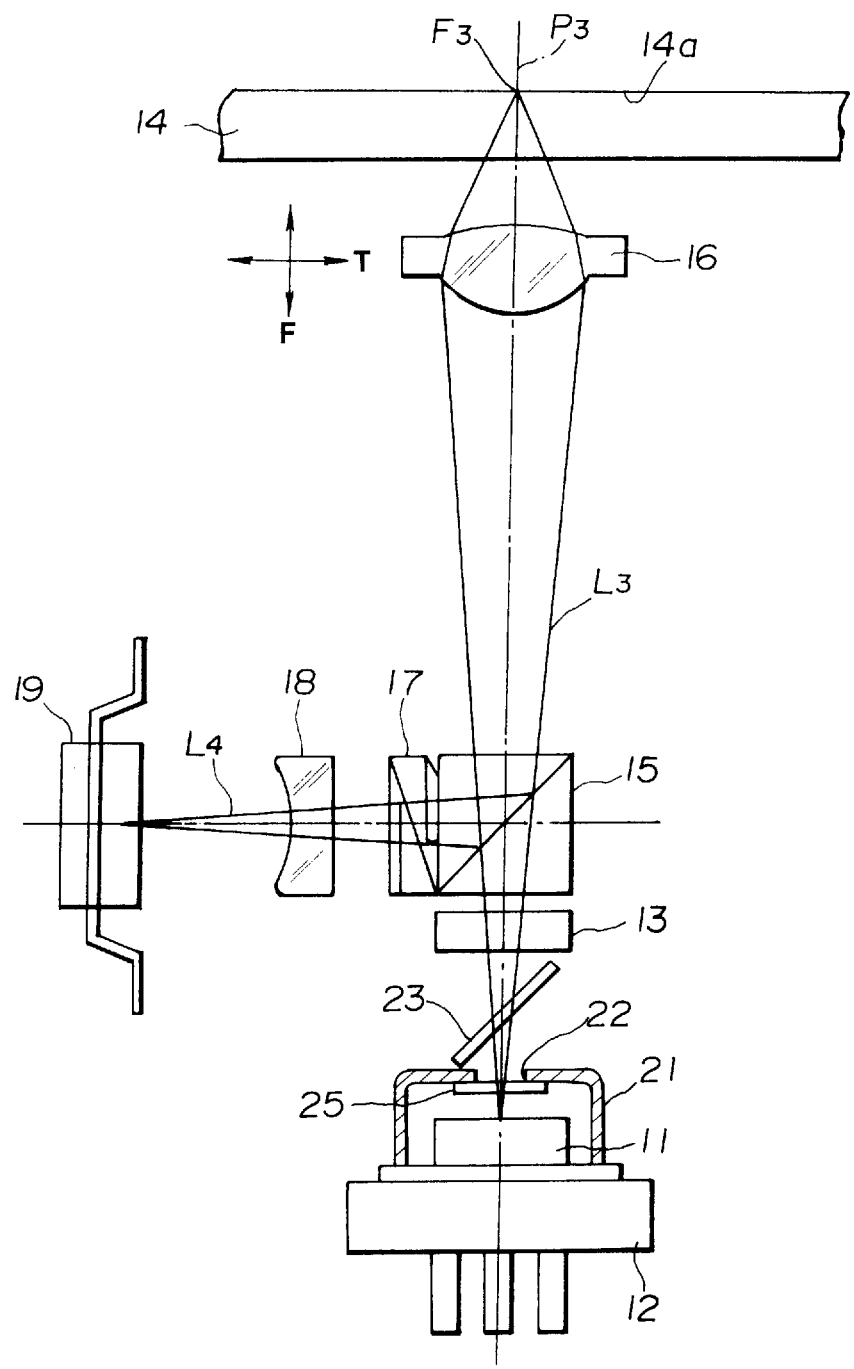
FIG. 15 is a cross-sectional side view showing another embodiment of the optical pickup device according to the present invention.
Figure 16:
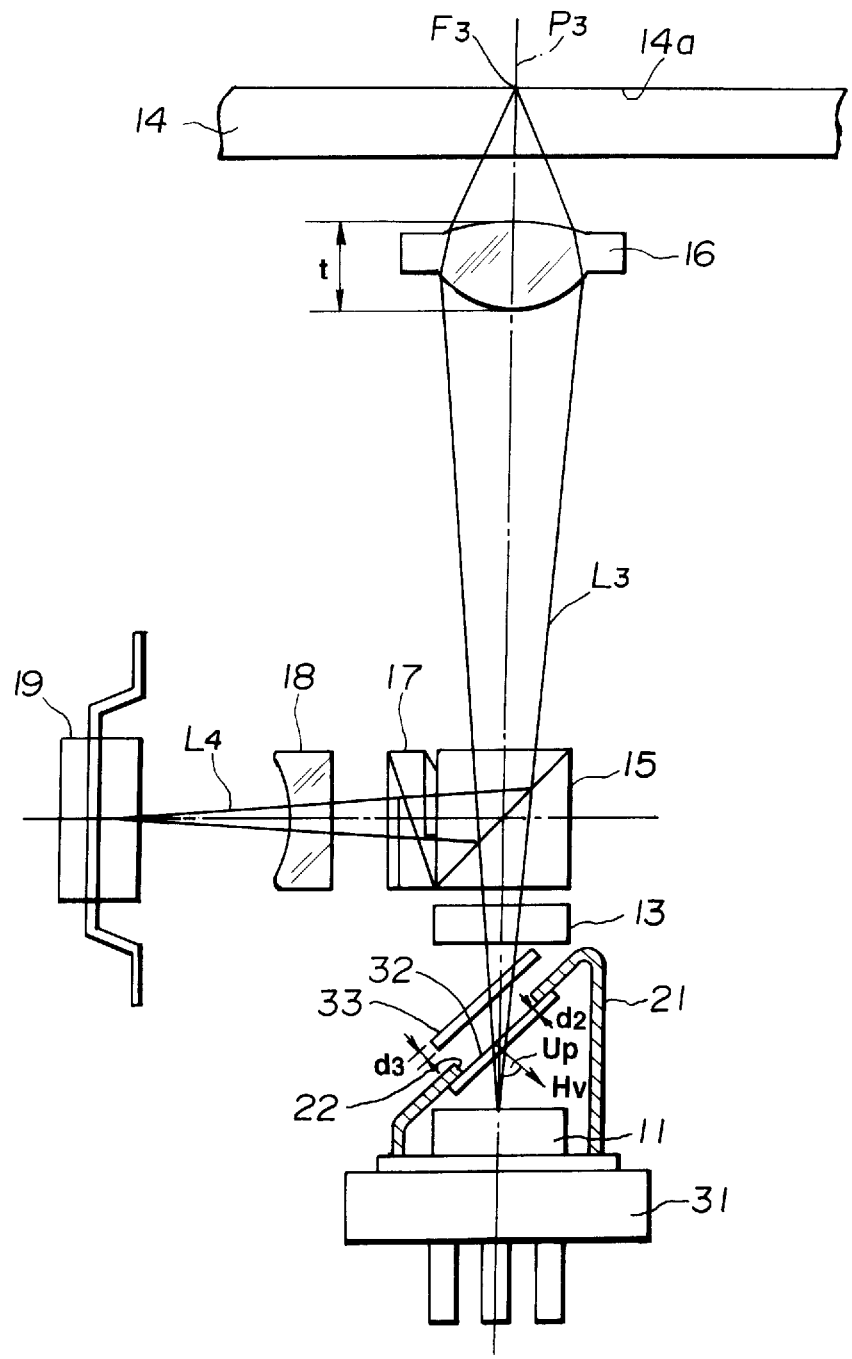
FIG. 16 is a cross-sectional side view showing a still another embodiment of the optical pickup device according to the present invention.

The optical pickup device, shown in FIG. 15, uses a semiconductor laser element 31 in which a first plan-parallel flat plate 32 for applying the correction which does not go so far as to over-correct the astigmatic aberration produced in the semiconductor laser element 11, that is for correcting the astigmatic aberration substantially to zero, as shown in FIG. 16.

The semiconductor laser element 11 enclosed within the semiconductor laser element 31 uses a gain-guiding type semiconductor laser element 31. This semiconductor laser has the astigmatic aberration of 25 μm. If a first plan-parallel flat plate 32 formed by a glass plate with a thickness d2 of 0.1 mm and a refractive index N of 1.5 is placed in the opening 22 of the cap 21 within the semiconductor junction plane (X–Y plane) of the semiconductor laser element 11 with the inclination angle $U_p$ of 45°, $$As=1_s-1_t=-0.025 \text{ mm}=-25 \text{ μm}$$

from the above equation (1). Since the astigmatic aberration of the gain-guiding type semiconductor laser is approximately 25 μm, the astigmatic aberration of the light beam from the semiconductor laser can be corrected substantially to 0. The coma aberration produced at this time is approximately 0.02 λ in RMS value which is negligible.

In the optical pickup device, shown in FIG. 16, a second plan-parallel flat plate 33 is arranged between the grating 13 and the first plan-parallel flat plate 32 provided on the semiconductor laser device 31. When the objective lens 16 is displaced responsive to the tracking error signal in the tracking direction normal to its optical axis, such that the point of convergence F3 of the light beam L3 radiated on the optical disc 14 is offset towards the outer peripheral edge of the field of view of the objective lens 16, as in FIG. 13, the second plan-parallel flat plate 33 applies the astigmatic aberration opposite to the astigmatic aberration ascribable to the objective lens 16 to the light beam L3 radiated from the semiconductor laser 11. For this second plan-parallel flat plate 33, a glass plate with a thickness d3 of 0.24 mm and with the refractive index N=1.5 is used and arranged parallel to the first plan-parallel flat plate 32, that is with the inclination angle $U_p$ of 45° within the semiconductor junction plane (X–Y plane).

For the objective lens 16, an objective lens with a thickness t on the optical axis of 1.6 mm and with the numerical aperture NA of 0.45, with the multiplication factor of 0.45, was used.

Figure 17:
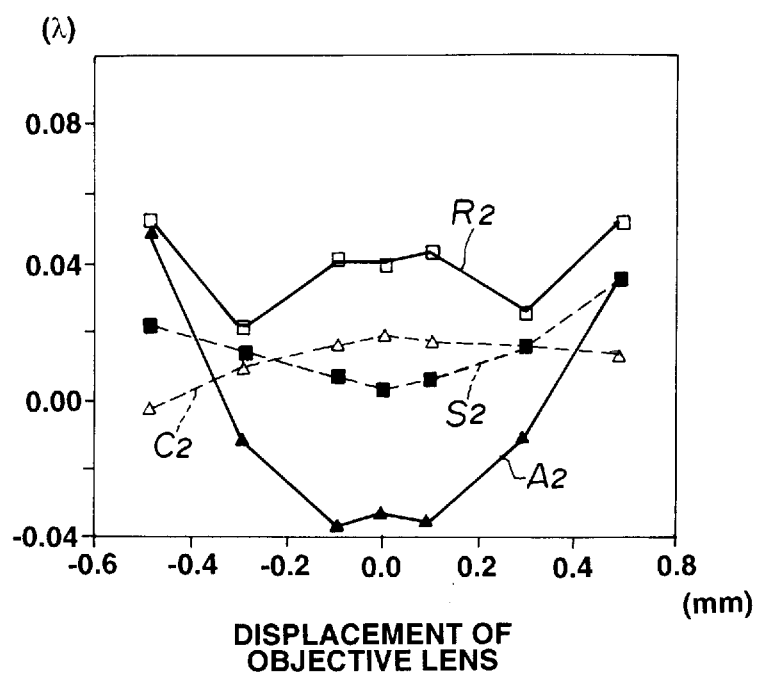
FIG. 17 shows the relation between the displacement of the objective lens and respective aberrations in the optical pickup device shown in FIG. 16.

FIG. 17 shows various aberrations produced at the point of convergence F3 of the light beam L3 when the objective lens 16 of the above-described optical pickup device is displaced in the tracking direction normal to the optical axis P3, that is, the aberrations produced on the signal recording surface of the optical disc 14. That is, the coma aberration at the convergence point F3 of the light beam L3 is as shown by a curve C2 in FIG. 17, while the spherical aberration is as shown by a curve S2 therein. The astigmatic aberration is as shown by a curve A2 in FIG. 17, with the wavefront aberration of the light beam in its entirety being as shown at R2 therein.

It is seen from the results shown in FIG. 17 that the astigmatic aberration A2 when the objective lens 16 is at the initial position or in its vicinity, with the convergence point F3 of the light beam L3 being on the optical axis P3 of the objective lens 16, is substantially equivalent to the light beam L3 radiated from the semiconductor laser element 11 plus an over-correction, or approximately −0.04 λ. The astigmatic aberration A2 at the outer peripheral edge of the objective lens 16 displaced approximately 0.5 mm from the initial position in a direction normal to the optical axis P3 is on the order of 0.05 λ which is smaller than the astigmatic aberration produced by field-of-view deviation of the objective lens 16 in which the objective lens is displaced towards the outer periphery of the light beam L3 in the diffused state. The reason is that the astigmatic aberration produced by field-of-view deviation of the objective lens 16 is canceled by the astigmatic aberration substantially equivalent to the over-correction applied to the light beam L3 radiated from the semiconductor laser element 11.

The wavefront aberration R2 when the objective lens 16 is at the initial position or in its vicinity, with the convergence point F3 of the light beam L1 being on the optical axis P3 of the objective lens 16, is approximately 0.004 λ in the RMS value, while the wavefront aberration R2 at the outer peripheral edge of the objective lens 16 displaced approximately 0.5 mm from the initial position in a direction normal to the optical axis is on the order of 0.005 λ in RMS value. Thus, in the entire field of view of the objective lens 16, the wavefront aberration R2 is suppressed to a value not larger than 0.07 λ which is the RMS value of the wavefront aberration thought to be the limit of diffraction required in the optical disc recording and/or reproducing apparatus, thus enabling correct recording and/or reproduction of the information signals to the optical disc 14.

Figure 7:
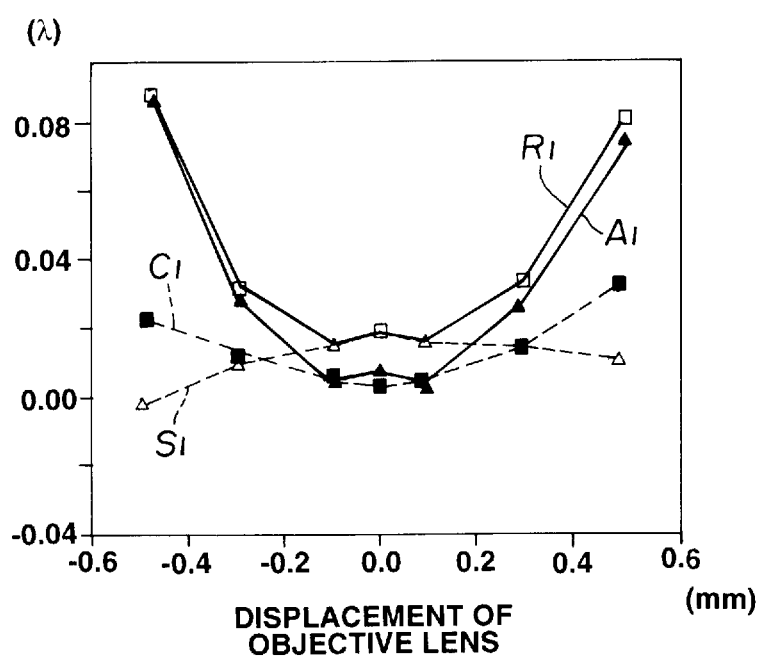
FIG. 7 illustrates the relation between the amount of displacement of the objective lens and respective aberrations in the optical pickup device shown in FIG. 3.
Figure 8:
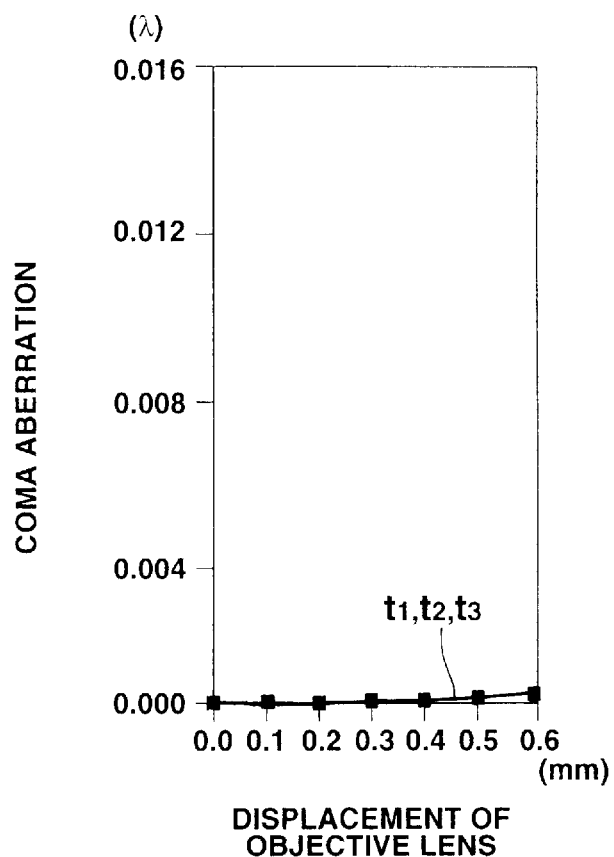
FIG. 8 illustrates the state of generation of coma aberration and the displacement of the objective lens in case the thickness of the objective lens is changed.
Figure 9:
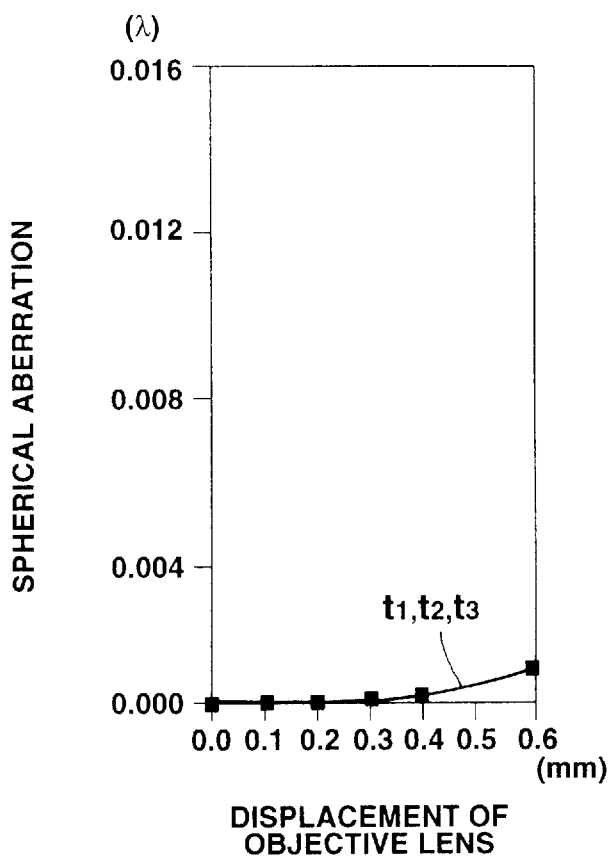
FIG. 9 illustrates, similarly to FIG. 8, the state of generation of coma aberration and the displacement of the objective lens in case the thickness of the objective lens is changed.
Figure 10:
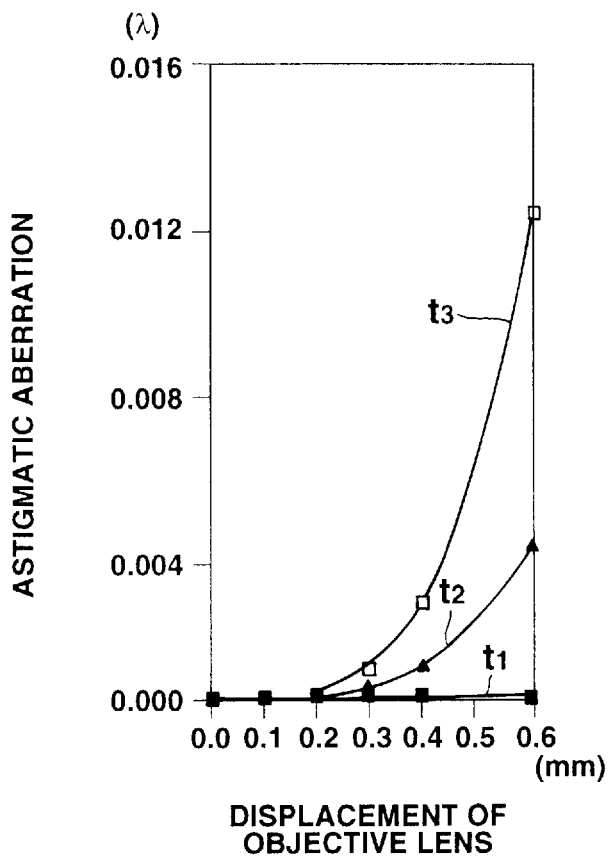
FIG. 10 illustrates, similarly to FIGS. 8 and 9, the state of generation of coma aberration and the displacement of the objective lens in case the thickness of the objective lens is changed.
Figure 11:
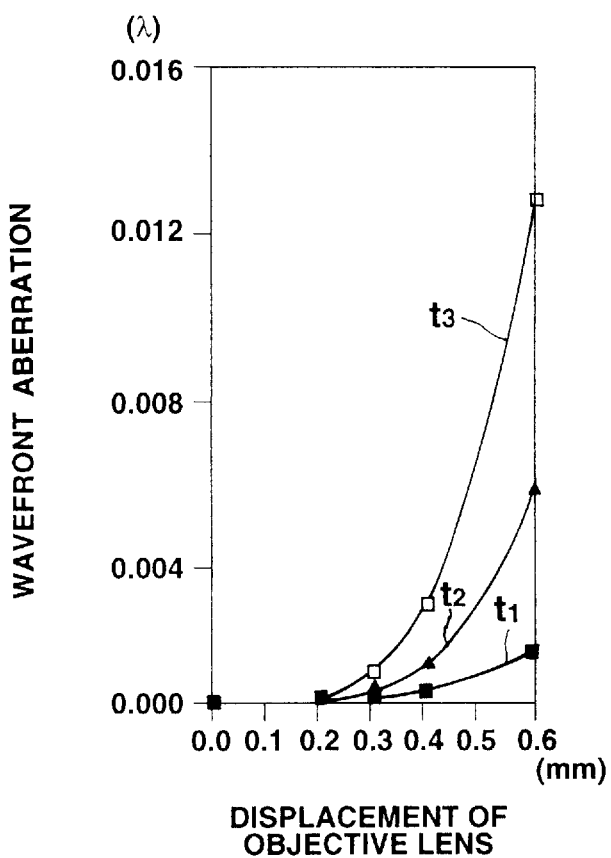
FIG. 11 illustrates, similarly to FIGS. 8, 9 and 10, the state of generation of coma aberration and the displacement of the objective lens in case the thickness of the objective lens is changed.

As may be seen from FIGS. 7 and 17, the coma aberration C2 or the spherical aberration S2 is not affected significantly by using the light beam L3 having the over-corrected astigmatic aberration.

In the optical pickup device, shown in FIG. 6, the first and second plan-parallel flat plates 32, 33 may each be constituted by plural plates.

The plan-parallel flat plate, as means for over-correcting the astigmatic aberration of the light beam radiated from the semiconductor laser element, may also be arranged between the objective lens and the optical disc, by reason of the above-described correction of the astigmatic aberration.

The plan-parallel flat plate, applying the over-correction to the astigmatic aberration of the light beam radiated from the semiconductor laser element, may be arranged so that its normal line vector is inclined at a pre-set angle, such as 45°, relative to the optical axis. In addition, the plan-parallel flat plate may have an evaporated film coated on its surface on which falls the return light from the optical disc so as to be used simultaneously asa beam splitter.

An objective lens for converging the light beam radiated from the semiconductor laser element on the signal recording surface of the optical disc may also be used as means for over-correcting the astigmatic aberration of the light beam radiated from the semiconductor laser element. In this case, the objective lens is formed as an elliptical non-spherical lens for producing pre-set astigmatic aberration.

The optical device according to the present invention, in which a semiconductor laser element is used and which includes means for over-correcting the astigmatic aberration of the light beam radiated from the lease element, may be used as a distance measurement device, an object motion measurement device, a device for producing a master disc for optical discs, or as an information transmission system.

The amount of over-correction of the astigmatic aberration of the light beam radiated from the semiconductor laser element is determined by two parameters, namely the thickness and the angle of inclination of the plan-parallel flat plate. Therefore, the thickness and the angle of inclination of the plan-parallel flat plate is suitably selected in congruity with the setting amount of over-correction of the astigmatic aberration of the light beam. At this time, the coma aberration is also determined by the above two parameters of the thickness and the angle of inclination of the plan-parallel flat plate. Specifically, the astigmatic aberration and the coma aberration are proportionate to the thickness of the plan-parallel flat plate, while the astigmatic aberration is proportionate to approximately the square of the inclination angle and the coma aberration is proportionate to the inclination angle. Thus, for over-correcting the astigmatic aberration while suppressing the coma aberration to a smaller value, it is desirable to set the thickness and the inclination angle of the plan-parallel flat plate to a smaller value and to a larger value, respectively.

In the above-described embodiments, a gain-guiding type semiconductor laser as a sort of the double hetero junction semiconductor laser is used as a light source. However, the present invention may also be applied to a light source device and to an optical pickup device subjected to astigmatic aberration in which the oscillated light beam has different oscillating points in the semiconductor junction plane and in a plane normal thereto thus giving rise to astigmatic aberration..

What is claimed is:

1. An optical device comprising:
    a semiconductor laser subjected to astigmatic difference in which the oscillated light beam has different light emitting points in the semiconductor junction plane and in a plane normal thereto; and
    correction means arranged in a light path of a light beam radiated from said semiconductor laser for over-correcting the astigmatic difference of the light beam radiated from said semiconductor laser.

2. The optical device as claimed in claim 1 wherein said correction means comprises a light-transmitting plate-shaped optical element.

3. The optical device as claimed in claim 2 wherein said plate-shaped optical element is arranged in a dispersion light path of said semiconductor laser with an inclination relative to the optical axis of the light beam radiated from said semiconductor laser in a direction of over-correcting said astigmatic aberration.

4. The optical device as claimed in claim 2 further comprising:
    a casing for housing said semiconductor laser, said casing having an opening through which the light beam outputted by said semiconductor laser is outputted, said plate-shaped optical element being mounted obliquely in said opening in said casing.

5. The optical device as claimed in claim 1 wherein correction means comprises a cylindrical lens.

6. An optical pickup apparatus comprising:
    a light source for radiating a light beam;
    an objective lens for converging the light beam in the dispersed state, radiated from said light source; and
    correction means arranged in an outgoing light path of the light beam radiated from said light source for over-correcting the astigmatic aberration of the light beam radiated from said light source.

7. The optical pickup apparatus as claimed in claim 6 wherein said light source comprises a semiconductor laser subjected to astigmatic difference in which the oscillated light beam has different light emitting points in the semiconductor junction plane and in a plane normal thereto.

8. The optical pickup apparatus as claimed in claim 7 wherein said correction means is arranged in an outgoing light path from said light source between the light source and the objective lens.

9. The optical pickup apparatus as claimed in claim 8 wherein said correction means comprises a cylindrical lens.

10. The optical pickup apparatus as claimed in claim 7 wherein said correction means comprises a light-transmitting plate-shaped optical element.

11. The optical pickup apparatus as claimed in claim 10 wherein said light source comprises a casing for housing said semiconductor laser, said casing having an opening through which the light beam outputted by said semiconductor laser is outputted, said plate-shaped optical element being mounted obliquely in said opening in said casing.

12. The optical pickup apparatus as claimed in claim 10 wherein said plate-shaped optical element is arranged in a dispersion light path of said semiconductor laser with an inclination relative to the optical axis of the light beam radiated from said semiconductor laser in a direction of over-correcting said astigmatic aberration.

* * * * *